Figure 1:
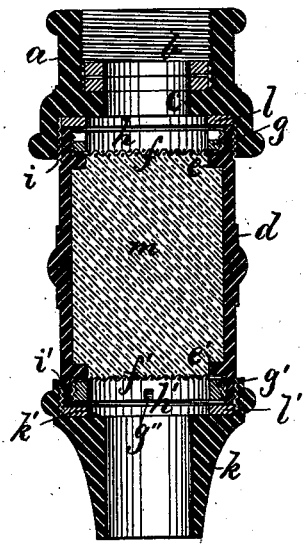

E. C. HOUGHTON.
Reversible-Filter.

No. 209,809.  Patented Nov. 12, 1878.

Witnesses:
Henry Chadbourn.
F. Allen.

Inventor:
Edward C. Houghton
by Alban Andrien,
his atty.

UNITED STATES PATENT OFFICE.

EDWARD C. HOUGHTON, OF BOSTON, MASSACHUSETTS, ASSIGNOR OF ONE-HALF HIS RIGHT TO JOTT GRANT, OF SAME PLACE.

IMPROVEMENT IN REVERSIBLE FILTERS.

Specification forming part of Letters Patent No. 209,809, dated November 12, 1878; application filed August 5, 1878.

*To all whom it may concern:*

Be it known that I, EDWARD C. HOUGHTON, of Boston, in the county of Suffolk and State of Massachusetts, have invented certain new and useful Improvements in Reversible Filters; and I do hereby declare that the following is a full, clear, and exact description thereof, which will enable others skilled in the art to which it appertains to make and use the same, reference being had to the accompanying drawings, and to letters of reference marked thereon, which form a part of this specification.

My invention relates to improvements in reversible filters for cocks, faucets, &c.; and consists of a filter-box provided in each end with an external screw-thread, the upper end being screwed into a corresponding female screw-thread in the ordinary screw-coupling at the terminus of the cock, faucet, or other cut-off. An ordinary nozzle is screwed over the lower screw-threaded end of the filter-box. An internal annular flange is made in either end of the filter-box a short distance from its extreme ends, which flange serves as a support for the strainer in each end. Each strainer is held in position by means of a screw-threaded ring screwed within an internal screw-threaded part of the filter-box. These screw-rings are provided with notches or recesses, so as to enable their being screwed in and out by means of a key for this purpose. Between the strainer and the extreme end of the filter-box is made in each end of the latter a chamber, so as to equalize the flow of the liquid. The filtering material is contained directly within the filter-box, between the upper and lower strainer, and in this manner a very simple contrivance is obtained as compared with the reversible filters, in which a separate filter-box is employed in connection with an outer shell or case. In case the apparatus gets clogged up with impurities, the filter-box can easily be reversed from its original position simply by removing the screw-threaded nozzle and detaching the filter-box from its screw-coupling and attaching it to the latter in a reversed position, after which the nozzle is attached as at first.

My invention further relates to the combination, with a filter-box, as described, of a screw-coupling provided with a sprinkler or perforated diaphragm, located above the upper strainer in the filter-box, for the purpose of relieving the pressure on the upper strainer of the filter-box and dividing the solid column of water into a spray before striking the upper strainer or filter-box, and thus preventing the water from cutting a channel through the filtering material.

Figure 2:
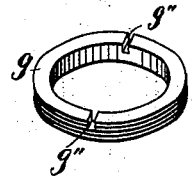
Figure 3:
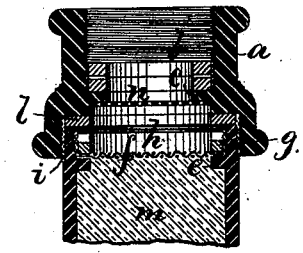
Figure 4:
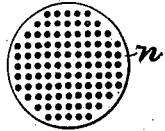

Referring to the drawings, Figure 1 represents a longitudinal section of my improved reversible filter with its screw-coupling and nozzle. Fig. 2 represents a perspective view of one of the screw-threaded rings for securing the strainer in position. Fig. 3 represents a sectional view of the screw-coupling with its sprinkler or perforated diaphragm. Fig. 4 represents a plan of said sprinkler or perforated diaphragm.

$a$ is the screw-coupling, with its packings $b$ and annular flange $c$, as usual. $d$ is the filter-box, provided with the annular flanges $e$ $e'$, upon which the strainers $f$ $f$ are supported, as shown. $g$ $g'$ are the screw-threaded holding-rings for the strainers, which rings are screwed into female screw-threads cut in the ends of the filter-box $d$. $g''$ $g''$ are notches or recesses in the screw-rings $g$ $g'$, as and for the purpose described. $h$ $h'$ are the chambers between the strainers $f$ $f'$ and the extreme ends of the filter-box $d$, as shown, and for the purpose set forth. $i$ $i'$ are external screw-threads on the outer ends of the filter-box $d$, fitting within female screw-threads in the lower part of the screw-coupling $a$ and upper part of the nozzle $k$. $l$ is a packing in the screw-coupling $a$, between the annular projection $c$ and the upper end of the filter-box $d$. $l'$ is a similar packing-ring between the lower end of the filter-box and the annular projection $k'$ in nozzle $k$. $m$ represents the filtering material contained within the filter-box $d$ between the strainers $f$ $f'$.

In Figs. 3 and 4, $n$ is the sprinkler, located within the screw-coupling, and secured therein, as shown, by means of solder, or spinning it in, or similar means, as may be desirable, which sprinkler is provided with perforations, as shown in Fig. 4, for the purpose set forth.

What I wish to secure by Letters Patent and claim is—

1. The herein-described improved reversible filter, consisting of the filter-box $d$, made alike in both ends, and containing the filtering material $m$, and provided with annular internal flanges $e\ e'$, strainers $f\ f'$, screw-threaded rings $g\ g'$, and chambers $h\ h'$, substantially as and for the purpose set forth.

2. The combination, with the filter-box $d$, its strainers $f\ f'$, and filtering material $m$, of the screw-coupling $a$, with its sprinkler or perforated diaphragm $n$, substantially as and for the purpose set forth.

In testimony that I claim the foregoing as my own invention I have affixed my signature in presence of two witnesses.

EDWARD C. HOUGHTON.

Witnesses:
  ALBAN ANDRÉN,
  NATHL. EVANS.